United States Patent Office 3,363,089
Patented Jan. 9, 1968

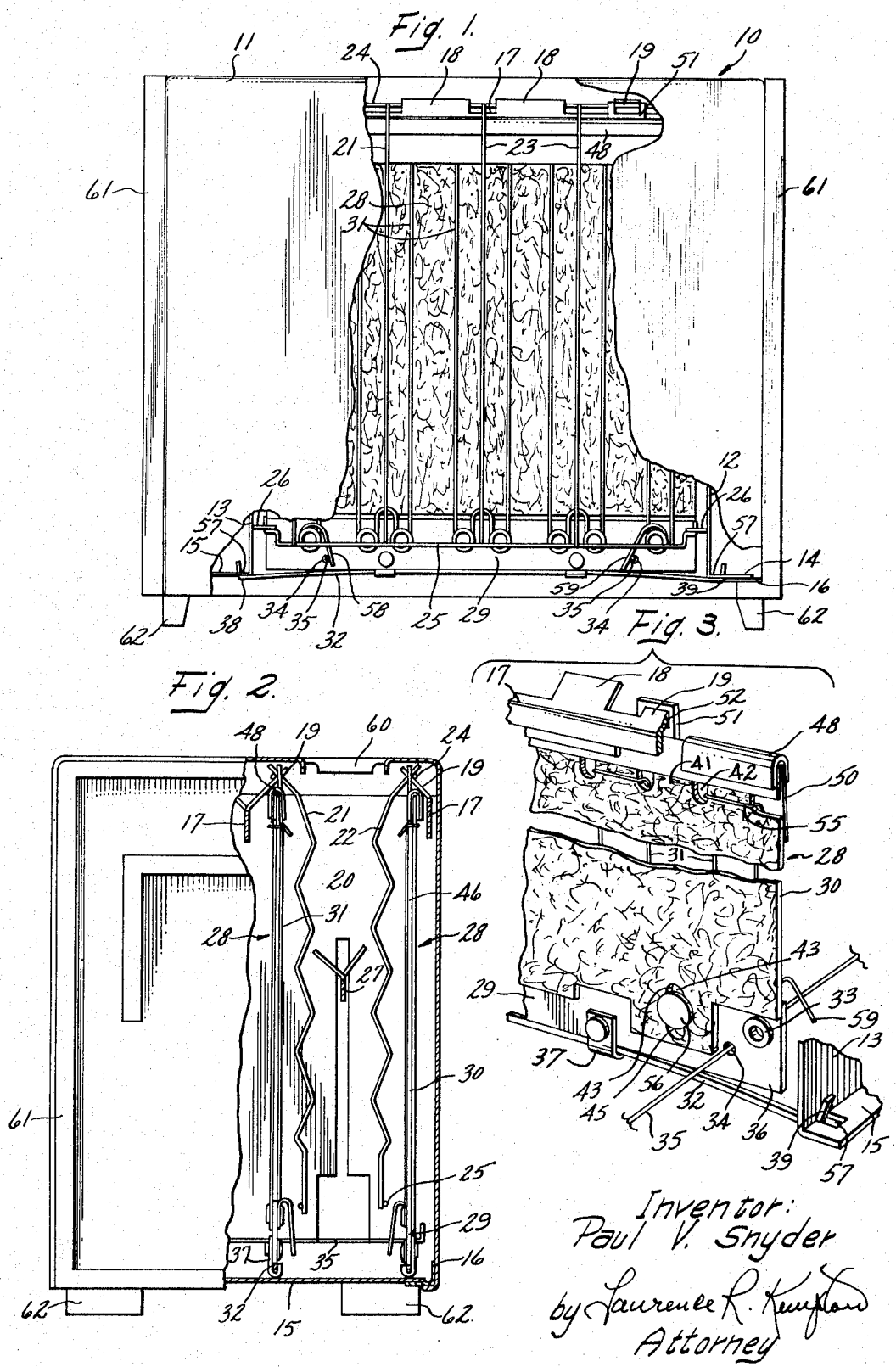

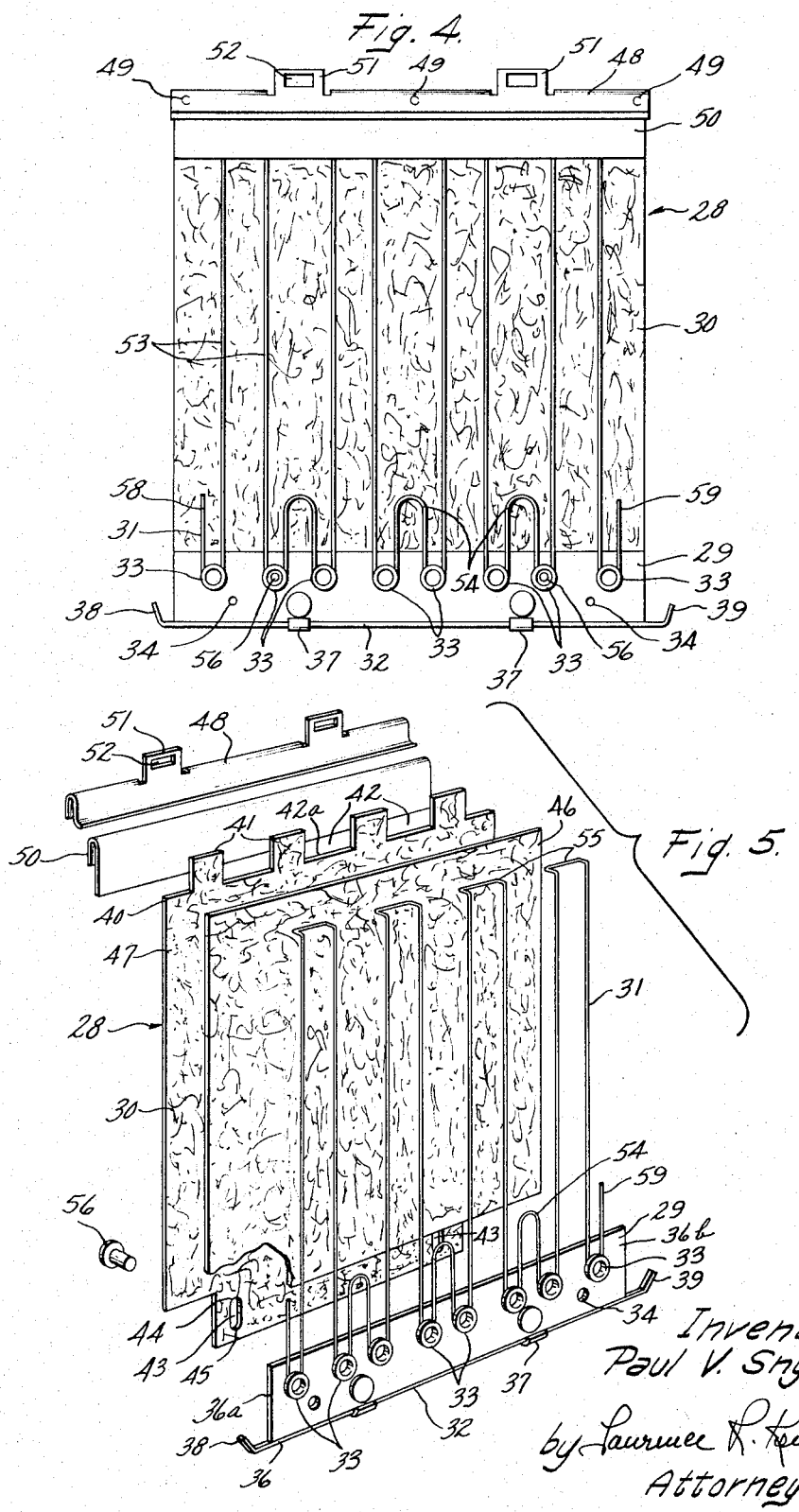

3,363,089
ELECTRIC TOASTER WITH HEATER TENSIONING MEANS
Paul V. Snyder, Fullerton, Pa., assignor to General Electric Company, a corporation of New York
Filed Dec. 30, 1965, Ser. No. 517,615
6 Claims. (Cl. 219—537)

ABSTRACT OF THE DISCLOSURE

A heating unit for an electric toaster wherein a heater wire is strung between two support members at opposite ends of the toasting chamber which are resiliently biased away from one another by a leaf spring connected to one of the support members and the toaster frame so as to maintain tension on the heater wire.

---

The present invention relates to electric toaster assemblies; and, more particularly, to toaster heating units having means to tension the heater wire when the unit is assembled in a toaster frame.

In the manufacture of electric toasters, it is common practice to place a heating unit adjacent a toasting chamber to supply heat thereto. The heater wire is often disposed on the heating unit in a zig-zag or serpentine pattern; and when the heating unit is assembled in the toaster, the heater wire occupies a plane confronting the toasting chamber. Expansion of the heater wire when it is heated to incandescence may cause portions of the wire to deflect from this plane, causing uneven toasting. For this reason it is desirable to provide means to accommodate for this expansion by keeping the heater wire in tension both before and during incandescence.

It is therefore an object of the present invention to provide a heating unit with improved means to tension the heater wire when the heating unit is assembled to a toaster, and wherein the wire remains in tension even when heated to incandescence.

It is a further object to provide an improved heating unit and associated frame structure wherein the act of assembling the heating unit to a toaster frame automatically places the heater wire in tension and assures proper position of the heater wire relative to a toasting chamber during operation of the toaster.

It is another object to provide a heating unit for use in a toaster assembly with means to tension the heater wire wherein the tensioning means does not add materially to the cost of the heating unit or to the cost of assembling the heating unit to the toaster frame.

Briefly stated, in accordance with one aspect of my invention, I provide an electric toaster heating unit which includes a heating wire connected to first and second supports. The first support carries a spring which engages the frame of the toaster when assembled thereto so as to urge the first support away from the second support, the second support being secured to the frame in a manner which prevents its moving toward the first support. Thus, any expansion in the heater wire on being heated is taken up by the movement of the first support. An important feature resides in the manner in which the tensioning force is placed on the heater wire so as to assure that the heater will not change its spacing from the toasting chamber at any time during operation of the toaster.

The subject matter which I regard as my invention is particularly pointed out and distinctly claimed in the concluding portion of the specification. My invention, however, together with further objects and advantages thereof, may best be understood by reference to the following description taken in connection with the accompanying drawing in which:

FIG. 1 is a side elevational view of a toaster partially cut away to show a heating unit assembled therein;

FIG. 2 is an end elevational view of the toaster of FIG. 1 also partially cut away to show internal components of the toaster;

FIG. 3 is a partial prospective view showing one end of a heating unit connected to the frame of the toaster;

FIG. 4 is a side elevational view of the toaster heating unit; and

FIG. 5 is an exploded prospective view of the toaster heating unit of FIG. 4.

Now referring to FIGS. 1 and 2 there is illustrated a toaster assembly 10 which includes an inner frame and an outer cover 11. The inner frame includes spaced vertical end walls 12 and 13 each having a flange 14 and 15 along the bottom edge thereof to support the end walls on lower angle members 16 extending between opposite ends of the toaster. The frame further includes upper rigid horizontal bars 17 extending between and secured to the end walls to provide a relatively rigid frame construction. The bars 17 are each provided with pairs of integral angular projections 18 and 19 for reasons which will hereinafter be pointed out in further detail.

A toasting chamber 20 is defined by opposed wire guides 21 and 22 for guiding the bread. Each guide includes a plurality of parallel vertical wires 23 connected together at the top and bottom ends by horizontal wires 24 and 25. To assemble each guide to the frame, opposite ends of the wire 25 are inserted in apertured tabs 26 struck from the end walls, and then the wire 24 is positioned over the projections 18 on the bar 17. A bread carrier 27 is movable vertically in the toasting chamber as is conventional in "pop-up" style toasters. It is to be understood that any of several conventional actuating and timing means may be used to actuate the bread carrier. Also, while I have illustrated in detail only a single toasting chamber, it is to be understood that two or more identical chambers may be utilized in a single toaster.

Identical heating units 28 are supported from the frame on opposite sides of the toasting chamber and, as indicated above, this invention resides primarily in the means incorporated in the heating unit which permits the unit to be easily assembled to the frame so as to provide tension on a heater wire.

As seen clearly at FIGS. 3–5; the heating unit 28 comprises, as basic members, a first or lower support 29, a second or upper support 30, a resistance heater wire 31, and spring means 32 secured to the support 29.

The support 29 is in the form of a strip of relatively stiff insulating material such as stiff asbestos or mica board. A plurality of aligned apertures extend through this strip and these apertures accommodate metallic eyelets 33 which are used to connect the heater wire 31 to this support. The wire engaging eyelets 33 are substantially, but not necessarily exactly aligned on a horizontally extending longitudinal axis. Other apertures 34 are for the insertion of electrically conducting rods 35 through the strip. The spring 32 in the shape of a rod is, in fact, resilient leaf spring formed, for example, of stainless steel and is secured along the bottom edge 36 of support 29 through the medium of brackets 37. Hook portions 38 and 39 are formed on the opposite ends of the spring. It is important to note that these hook portions are in substantially the same plane as the support 29. In other words, the spring extends from the support in a direction substantially parallel to the longitudinal axis of the wire engaging eyelets 33. The hook portions are spaced from the opposite side edges 36a and 36b (FIG. 5) of the support 29.

The upper support 30 is also formed of a sheet of relatively stiff, hard material which may be stiff asbestos, The top edge 40 of this support presents a series of alternating ridges 41 and valleys 42. Spaced elongated apertures 43 are provided near the bottom edge of this support. The top surface surrounding each aperture 43 is indicated at 44, and the bottom surface surrounding the aperture is indicated at 45.

I prefer to mount a second sheet 46 of heat insulating material on the front surface 47 of the support 30 to enhance the thermal transfer from the heater wires to the toasting chamber. This second sheet is relatively soft and flexible, and is made in the form of a mat of fibrous material having good heat insulation properties. One suitable material which may be used is sold by Carborundum Company, Niagara Falls, N.Y., under the trademark "Fiberfrax." It may be desirable to apply a liquid coating of material such as colloidal silica liquid on the surface of the sheet facing the heater wire, which liquid material solidifies on the sheet to increase the scuff resistance of its surface.

The heating unit also includes means to mount the unit on an upper frame member 17 of the toaster; and, for this, I utilize a metallic generally U-shaped connector 48 which is crimped as at 49 to secure this connector to the top edge of the support 30. A flexible strip of insulating material 50 positioned between the connector 48 and the support 30 assures that the connector will be isolated electrically from the heater wire. Tabs 51 having apertures 52 are struck from the connector and extend above the top surface thereof.

The several parts of the heating unit may be assembled in the following manner:

The heater wire 31 may be first connected to the support 29 by the use of eyelets 33. The heater wire includes relatively long runs 53 alternating with short runs 54 in order to provide even toasting to the top and bottom of the bread. The long runs of the heater have bends 55 at the top so that the wire may be inserted over the ridges 41 in the second support and come to rest on the bottom surface 42a of the valleys. The length of the long runs is such that when the wire is nested in the valleys, the top portion 44 of apertures 43 are in alignment with two of the eyelets 33 in the support 29 so that a rivet 56 may be inserted through these eyelets to slidably connect the support 29 to the support 30. Now, assuming the connector 48 and spring 32 have been attached to the supports, the heating unit is ready to be assembled in the toaster.

To assemble the heating unit in the toaster, the hooked end portions 38 and 39 of the springs are placed in apertures or grooves 57 formed in the opposite end walls 12 and 13. It is important that the grooves 57 in one end wall are aligned with the grooves in the other end wall and are aligned with the bottom edge 36 of the support 29. The springs 32 engage a portion of each side wall as the heating unit is moved vertically upward against the bias of the springs. The unit is moved until the apertures 52 in tabs 51 can be positioned around projections 19 on the bar 17, and this fixes the top support 30 against downward movement. At this point the relative position of the parts will be approximately as illustrated at FIGURE 3 and it is seen that the rivet 56 has moved only part way down the aperture 43, and the spring 32 is flexed. The tendency of the spring to return to its normal relaxed position urges the support 29 downwardly away from the support 30; consequently, the heater wire 31 is held in tension. Any expansion of the heater wire will be taken up by further downward movement of the support 29 relative to the support 30. As is seen from the drawing, the main portion of the heater wire defines a plane confronting the toasting chamber.

With the arrangement just described, the tensioning force exerted on the heater wire is primarily only in the plane of the strip 29 and the plane of the heater 31. Thus, the heater wire maintains its original position in close proximity to the insulating backing 46 and relative to the toasting chamber 20 at all times.

As mentioned above, electrically conducting rods 35 are inserted through apertures 34, and the opposite ends 58 and 59 of the heater wire are welded thereto. These rods are electrically connected with appropriate terminals (not shown) permitting the heater wire to be connected to a household electrical supply source.

After the heating units have been assembled to the frame, the stamped metal outer cover 11 may be positioned around the frame and secured thereto. The outer cover includes elongated bread receiving opening 60 aligned with the toasting chamber or chambers. The toaster further includes plastic outer ends 61 which have legs 62 to support the toaster from a table. A bottom wall (not shown) may be pivotally attached to the bottom edge of the cover to provide for removal of crumbs.

While I have disclosed a particular embodiment of my invention, I do not desire my invention to be limited to the specific construction disclosed, and I intend by the appended claims to cover all modifications within the true scope of my invention.

What I claim is:

1. An electric toaster assembly having a toasting chamber and including:
   (a) a frame having opposite end members;
   (b) heating units, each including top and bottom supports, said units being disposed on opposite sides of said toasting chamber between said end members, each of said heating units further including a heater wire extending in serpentine fashion between said top and bottom supports and connected to each of said supports, each of said top and bottom supports comprising a generally planar strip electrically of insulating material;
   (c) a resilient leaf spring secured to the bottom edge of each of said bottom supports and having hooked portions spaced from the side edges of a respective support in substantially the same plane as said support;
   (d) said end members having means for engaging said hook portions; and
   (e) means cooperating with said top support for securing said top support to said frame when said spring is biasing said bottom support away from said top support.

2. The assembly as set forth in claim 1 wherein each of said end members has an aperture initially aligned with said bottom edge of said bottom support for receiving a hooked portion of said spring.

3. In an electric heating unit including a heater wire adapted to be electrically connected to an electrical power source and support means for said heater wire, for use in a toaster which has a frame and a toasting chamber, the improvement comprising:
   (a) said support means including first and second elongated support members of electrically insulating material having wire engaging portions substantially extending along a longitudinal axis and respectively disposed at opposite ends of said toasting chamber, said second support member being fixedly connected to said frame;
   (b) said heating wire being strung around said wire engaging portions of said support members in a generally serpentine path, a main portion of said heater wire defining a plane confronting said toasting chamber; and
   (c) an elongated spring means at one end of the toasting chamber fixedly connected to said first support member at the same end of said toasting chamber for biasing said wire engaging portion of said first support member away from said wire engaging portion of said second support member to maintain tension on said heater wire, said spring means extending from said first support member in a direction substantially parallel to the longitudinal axis of said wire engaging portions of said first support member, engaging at its ends said frame.

4. A device as in claim 3, the further improvement comprising:
   (a) a substantially rigid, planar heat insulating member connected to said second support member and disposed substantially parallel to and adjacent the plane of said heating wire so as to help insulate the heating chamber.

5. A device as in claim 4 wherein means are provided for slidably connecting said first support member to said heat insulating member.

6. A device as in claim 3 wherein said spring means includes end hook portions for fixedly engaging the ends of said spring means to said frame and wherein a sheet of relatively flexible heat insulating material is positioned between said heat insulating member and said heater wire.

References Cited

UNITED STATES PATENTS

| | | | |
|---|---|---|---|
| 1,065,015 | 6/1913 | Youmans | 338—316 X |
| 2,431,673 | 12/1947 | Auger | 219—532 |
| 2,462,607 | 2/1949 | Browne | 338—216 X |
| 2,685,633 | 8/1954 | Olson et al. | 219—532 |
| 2,747,072 | 5/1956 | Lawser | 219—521 |
| 3,019,324 | 1/1962 | Sohn | 219—347 |
| 3,119,924 | 1/1964 | Kneser | 338—316 X |

RICHARD M. WOOD, *Primary Examiner.*

V. Y. MAYEWSKY, *Assistant Examiner.*

UNITED STATES PATENT OFFICE
CERTIFICATE OF CORRECTION

Patent No. 3,363,089 January 9, 1968

Paul V. Snyder

It is hereby certified that error appears in the above numbered patent requiring correction and that the said Letters Patent should read as corrected below.

Column 4, line 34, for "strip electrically of" read -- strip of electrically --.

Signed and sealed this 4th day of March 1969.

(SEAL)
Attest:

Edward M. Fletcher, Jr.
Attesting Officer

EDWARD J. BRENNER
Commissioner of Patents